(12) United States Patent
Endres et al.

(10) Patent No.: US 6,668,014 B1
(45) Date of Patent: Dec. 23, 2003

(54) EQUALIZER METHOD AND APPARATUS USING CONSTANT MODULUS ALGORITHM BLIND EQUALIZATION AND PARTIAL DECODING

(75) Inventors: Thomas J Endres, Pipersville, PA (US); Samir N Hulyalkar, Plainsboro, NJ (US); Christopher H Strolle, Glenside, PA (US); Troy A Schaffer, Langhorne, PA (US); Raul A Casas, Doylestown, PA (US); Stephen L Biracree, Jamison, PA (US); Anand M Shah, Pendel, PA (US)

(73) Assignee: ATI Technologies Inc., Ontario (CA)

( * ) Notice: Subject to any disclaimer, the term of this patent is extended or adjusted under 35 U.S.C. 154(b) by 0 days.

(21) Appl. No.: 09/457,496

(22) Filed: Dec. 9, 1999

(51) Int. Cl.[7] ............................................... H03K 5/159
(52) U.S. Cl. ........................ 375/232; 375/341; 375/287; 375/224; 375/265; 375/229; 375/346; 375/350; 375/233; 375/340; 714/796; 714/786; 714/792; 714/794; 714/795; 708/322; 708/323
(58) Field of Search ................................ 375/341, 287, 375/224, 265, 229, 232, 346, 350, 233, 340; 714/796, 786, 792, 794, 795; 708/322, 323

(56) References Cited

U.S. PATENT DOCUMENTS

| | | | | |
|---|---|---|---|---|
| 5,384,810 A | * | 1/1995 | Amrany | 375/340 |
| 5,396,518 A | * | 3/1995 | How | 375/265 |
| 5,583,889 A | * | 12/1996 | Citta et al. | 375/341 |
| 5,629,958 A | * | 5/1997 | Willming | 375/295 |
| 5,636,251 A | * | 6/1997 | Citta et al. | 375/341 |
| 6,356,555 B1 | * | 3/2002 | Rakib et al. | 370/441 |

* cited by examiner

Primary Examiner—Stephen Chin
Assistant Examiner—Guillermo Munóz
(74) Attorney, Agent, or Firm—Allan Jacobson

(57) ABSTRACT

A digital communication receiver includes a blind equalizer using the Constant Modulus Algorithm (CMA) to compensate for channel transmission distortion in digital communication systems. Improved CMA performance is obtained by using a partial trellis decoder to predict 1 bit or 2 bits of the corresponding 3-bit transmitted symbol. The predicted bits from the partial trellis decoder are used to reduce the effective number of symbols in the source alphabet, which reduces steady state jitter of the CMA algorithm. Specifically, the received input signal to the CMA error calculation is shifted up or down by a computed delta ($\Delta$), in accordance with the predicted bit(s). In addition, a different constant gamma ($\gamma$), for the CMA error calculation is selected in accordance with the predicted bit(s). The disclosed technique is applicable to trellis and non-trellis codes in which at least one bit of the present symbol can be predicted in advance and used to reduce the effective number of symbols in the source alphabet.

22 Claims, 8 Drawing Sheets

EQUALIZER METHOD AND APPARATUS USING CONSTANT MODULUS ALGORITHM BLIND EQUALIZATION AND PARTIAL DECODING

FIELD OF INVENTION

The present invention relates to blind equalization techniques to compensate for channel transmission distortion in digital communication systems. In particular, the present invention relates to an equalization technique for use with trellis-encoded data such as that adopted by the U.S. for broadcast transmission of high definition television (HDTV) signals.

BACKGROUND OF THE INVENTION

Digital transmission of information typically involves the modulation of pulses on the amplitude and/or phase of an RF carrier. A propagation medium such as terrestrial broadcast introduces signal distortion caused by noise (static), strength variations (fading), phase shift variations, multiple path delays, and the like.

In addition, multiple different paths between the transmitter and receiver through the propagation medium cause multiple path delays. The different paths have different delays that cause replicas of the same signal to arrive at different times at the receiver (like an echo). Multi-path distortion results in inter-symbol interference (ISI) in which weighted contributions of other symbols are added to the current symbol.

In addition to distortion and noise from the propagation medium, front-end portions of the receiver and transmitter also introduce distortion and noise. The presence of distortion, noise, fading and multi-path introduced by the overall communication channel (transmitter, receiver and propagation medium), can cause digital systems to degrade or fail completely when the bit error rate exceeds some threshold and overcomes the error tolerance of the system.

Equalization

Digital systems transmit data as symbols having discrete levels of amplitude and/or phase. The digital receiver uses a slicer to make hard decisions as to the value of the received symbol. A slicer is a decision device responsive to the received signals at its input, which outputs the nearest symbol value from the constellation of allowed discrete levels. A slicer is also known as a nearest element decision device. To the extent that a symbol is received at a level that differs from one of the allowed discrete levels, a measure of communication channel error can be detected.

At the receiver, it is known to use an equalizer responsive to the detected error to mitigate the signal corruption introduced by the communications channel. It is not uncommon for the equalizer portion of a receiver integrated circuit to consume half of the integrated circuit area.

An equalizer is a filter that has the inverse characteristics of the communication channel. If the transmission characteristics of the communication channel are known or measured, then the equalization filter parameters can be determined. After adjustment of the equalization filter parameters, the received signal is passed through the equalizer, which compensates for the non-ideal communication channel by introducing compensating "distortions" into the received signal which tend to cancel the distortions introduced by the communication channel.

However, in most situations such as in HDTV broadcasting, each receiver is in a unique location with respect to the transmitter. Accordingly, the characteristics of the communication channel are not known in advance, and may even change with time. In those situations where the communication channel is not characterized in advance, or changes with time, an adaptive equalizer is used. An adaptive equalizer has variable parameters that are calculated at the receiver. The problem to be solved in an adaptive equalizer is how to adjust the equalizer filter parameters in order to restore signal quality to a performance level that is acceptable by subsequent error correction decoding.

In some adaptive equalization systems, the parameters of the equalization filter are adjusted using a predetermined reference signal (a training sequence), which is periodically re-sent from the transmitter to the receiver. The received training sequence is compared with the known training sequence to derive the parameters of the equalization filter. After several iterations of parameter settings derived from adaptation over successive training sequences, the equalization filter converges to a setting that tends to compensate for the distortion characteristics of the communications channel.

The U.S. standard for broadcast transmission of high definition television (HDTV) signals embeds a recurring training sequence every 24 milliseconds. Unfortunately, for terrestrial broadcast the propagation medium often undergoes time-varying inter-symbol interference characteristics, for example due to such subtle changes as foliage waiving in the wind, which prevent the successful convergence of an equalizer that relies solely on the training sequence for convergence. Therefore, a blind equalization technique is highly desirable.

In blind equalization systems, the equalizer filter parameters are derived from the received signal itself without using a training sequence. In the prior art, it is known to adjust the equalizer parameters blindly using the Least Mean Squares (LMS) algorithm, in which the training symbols are replaced with hard decisions, or best estimates of the original input symbols. Blind equalization systems using LMS in this manner are referred to as decision directed LMS (DD-LMS).

However, the DD-LMS algorithm requires a good initial estimate of the equalizer parameters. For most realistic communication channel conditions, the lack of an initial signal estimate of the equalizer parameters results in high decision error rates, which cause the successively calculated equalizer filter parameters to continue to fluctuate, (diverge or go to +/−infinity), rather than converge to a desired solution.

It is also known to use another algorithm, called the Constant Modulus Algorithm (CMA), in combination with the DD-LMS algorithm from a cold start. The CMA algorithm is used first to calculate the equalizer filter parameters, which is regarded as an initial estimate. Thereafter, the equalizer filter parameters (as calculated by the CMA algorithm) are used in an acquisition mode to find the initial equalizer filter parameters to start the DD-LMS algorithm.

The Constant Modulus Algorithm (CMA) was originally proposed by Godard for QAM signals. See D. N. Godard, "Self-recovering equalization and carrier tracking in two-dimensional data communication systems," IEEE Transactions on Communications, vol 28, no. 11, pp. 1867–1875, November 1980. A similar technique was independently developed by Treichler and Agee for constant envelope FM signals. See J. R. Treicher, B. G. Agee, "A new approach to multipath correction of constant modulus signals," IEEE Transactions on Acoustics, Speech, and Signal Processing, vol. ASSP-31, no. 2, pp. 459–472, April, 1983. Godard's original intention was to develop an algorithm that was insensitive to carrier synchronization in order to decouple equalization and carrier tracking, so that carrier tracking could be done in a decision directed (DD) mode. The satisfaction of the latter goal is the single-most attractive feature of CMA, which accounts for its widespread deployment today. See J. R. Treichler, M. G. Larimore, J. C. Harp, "Practical Blind Demodulators for High-Order QAM signals," Proceedings of the IEEE, Vol. 86, No. 10, pp. 1907–1926, October 1998.

The CMA algorithm (as well as the DD-LMS algorithm) is usually implemented with a gradient descent strategy in which the equalizer parameters are adapted by replacing the present equalizer parameter settings with their current values plus an error (or correction) term. See C. R. Johnson, Jr., P. Schniter, T. J. Endres, J. D. Behm, D. R. Brown, R. A. Casas, "Blind equalization using the constant modulus criterion: a review," Proceedings of the IEEE, vol. 86, no. 10, pp. 1927–1950, October, 1998. The CMA error term itself is a cubic function of the equalizer output.

The CMA algorithm may be modified for use with an equalizer for a high definition television (HDTV) receiver. In the U.S. HDTV standard, a carrier signal is amplitude modulated to one of 8 levels in a scheme known as 8-VSB (Vestigial Sideband) modulation. Each of the transmitted symbols is represented by a 3-bit code. The 8-VSB symbols are trellis encoded and interleaved in time. CMA is adapted for an 8-VSB HDTV signal by applying the Constant Modulus (CM) criterion to only the real part of the equalizer output. The imaginary component of the equalizer output is not calculated. The modified adaptive algorithm is referred to as Single Axis CMA (SA-CMA).

From a cold start, the receiver enters an acquisition mode. In the acquisition mode, the CMA algorithm is used first to adjust the equalizer parameters. Then, after a fixed period of time such as a fixed number of training sequences (or alternatively based on a measure of signal quality that is derived from the equalizer output), the receiver switches to the DD-LMS algorithm in a tracking mode. The acquisition mode typically requires up to 400,000 symbols. At a 10 MHz clock rate, the symbol rate is 100 nanoseconds and the time available for acquisition using the CMA algorithm is about 40 milliseconds.

The CMA algorithm is applicable to signals that have symbol values of constant magnitude, such as Quadrature Phase Shift Keying (QPSK). CMA also works for higher-order constellations containing symbol values of multiple magnitudes. However, the CMA algorithm suffers a high residual jitter in its steady state error. The resulting stochastic jitter, or misadjustment, is quantified by Fijalkow. See I. Fijalkow, C. E. Manlove, C. R. Johnson, Jr., "Adaptive fractionally-spaced blind CMA equalization: excess MSE," IEEE Transactions on Signal Processing, vol. 46, pp. 227–231, Janurary 1998. Jitter is the tendency of a control system to fluctuate (i.e., "jitter") above and below a steady state value.

SUMMARY OF THE INVENTION

The present invention is embodied in a method and apparatus for reducing stochastic jitter in a blind equalizer using the CMA algorithm, thereby improving the performance of the CMA algorithm. Improved performance is obtained by using a partial trellis decoder to predict 1 bit or 2 bits of the next corresponding 3-bit transmitted symbol. The predicted bits from the partial trellis decoder are used to reduce the effective number of symbols in the source alphabet. Specifically, an 8-VSB signal has 8 levels and a source alphabet of 8 symbols. If 1 bit of the subsequent 3-bit symbol is predicted, the number of permissible signal levels is reduced to 4 levels, which reduces the effective number of symbols in the source alphabet to 4 equally probable symbols. If 2 bits of the subsequent 3-bit symbol is predicted, the number of permissible signal levels is reduced to 2 levels, which reduces the effective number of symbols in the source alphabet to 2 equally probable symbols. The invention is applicable to coding schemes in which at least one bit of a received symbol can be determined from one or more prior symbols. If so, then at least one bit of the present symbol can be predicted in advance and used to reduce the effective number of symbols in the source alphabet seen by the CMA algorithm. The invention is thus applicable to many codes, including other trellis codes as well as to non-trellis codes.

Reducing the effective number of symbols in the source alphabet for soft decision CMA (blind) equalization is analogous to reducing the number of slicer levels in a hard decision, nearest element decision device. Reducing the number of slicer levels increases the (Euclidean) distance between decision levels in a slicer. An increased Euclidean distance between decision levels reduces the chance that the channel distortion will cause a symbol decision error, which improves convergence performance. In a hard decision, nearest element decision device, the effective slicer decision levels are changed in accordance with the predicted bit(s). In the present invention, the received input signal to blind equalization error calculation is offset, i.e., shifted up or down by a computed $\Delta$ in accordance with the predicted bit(s). In addition, when applied to CMA for blind equalization, a different constant, the Godard radius $\gamma$, for the CMA error calculation is selected in accordance with the predicted bit(s).

U.S. High Definition Television (HDTV) Standard

The equalizer method and apparatus of the present invention particularly applies to television receivers compatible with the U.S. HDTV transmission standard. In particular, the U.S. HDTV standard uses trellis encoding and data symbol interleaving. Trellis coding is well known. Data symbol interleaving is also a known technique used to mitigate the effects of burst errors (sequential errors resulting from a burst of static that can overwhelm the error correction capacity of the error coding subsystem). Data symbol interleaving (at the transmitter) and subsequent data symbol de-interleaving (at the receiver) spreads out the consecutive burst errors to different non-consecutive positions in the de-interleaved signal. In particular, in the U.S. HDTV transmission standard, data symbol interleaving is implemented on a 12-interval basis.

As a result, the ATSC standard for U.S. broadcast transmission of 8-VSB HDTV signals uses twelve parallel trellis encoders of the kind shown in FIG. 5. The 12 parallel trellis encoders are chosen sequentially in a circular manner to form a 12-interval symbol interleaver, as illustrated in FIG. 4 (ATSC Digital Television Standard Doc A/53). See Advanced Television Systems Committee (ATSC) Digital Television Standard, Document A/53, September 1995, downloadable from http:// www.atsc.org/ Standards/ A53/.

Improved CMA Equalizer Performance

The time lag resulting from the 12-interval symbol interleaving of the parallel trellis encoders is exploited to perform partial trellis decoding between successive data symbols received 12 symbol intervals apart. Each partial trellis decoder uses one or two prior data symbols to predict one bit (Z0) or two bits (Z0 and Z1) of the subsequent data symbols. By predicting 1 bit, Z0, the 8-level VSB signal is partitioned into two sets of four elements. By predicting 2 bits, Z0 and Z1, the 8-level VSB signal is partitioned into four sets of two elements.

In such manner, either a 2-level or 4-level signal (a set partitioned signal) is created from the 8-VSB signal. The bit estimates obtained from partial trellis decoding are thus used to reduce the number of hard decision levels in the slicer. With fewer slicer levels, the decision levels in the slicer are further apart, which reduces jitter and improves the convergence performance of the CMA blind equalization technique.

The predicted bit estimates are used to calculate the CMA error term used for updating the parameters of an adaptive CMA blind equalization filter. The error term (which is used in a cost function having a stochastic gradient descent) is calculated solely based on the received signal and a few known constants. The Constant Modulus criterion is applied to the set-partitioned signal so that the excess mean squared error, or stochastic jitter, is reduced. The resulting algorithm is referred to as low jitter CMA (LJ-CMA).

Initially on signal acquisition, the CMA equalizer mode is set for 8 symbol levels. After operating at 8 symbol levels for a first period of operation, the CMA equalizer mode is set for 4 symbol levels. After operating with 4 levels for a second period of operation, the CMA equalizer mode is set for 2 symbol levels. The criteria for switching the CMA equalizer from 8 levels, to 4 levels to 2 levels is based on any one of suitable convergence criteria: a fixed time interval, the signal to noise ratio, the bit error rate or number of consecutive training sequences encountered.

The latency associated with having 12 parallel trellis encoders means that there are twelve symbol intervals before the next symbol arrives for a given trellis encoder. Thus, there is sufficient time (12 symbol intervals) to estimate bits Z0 and Z1 for each of the parallel trellis encoders. U.S. patent application Ser. No. 09/099730, filed Jun. 19, 1998 to Hulyalkar et al., and assigned to the assignee of the present application describes several implementations whereby a bank of partial trellis decoders are used to estimate either bit Z0 or both bits Z0 and Z1.

DETAILED DESCRIPTION

Figure 1:
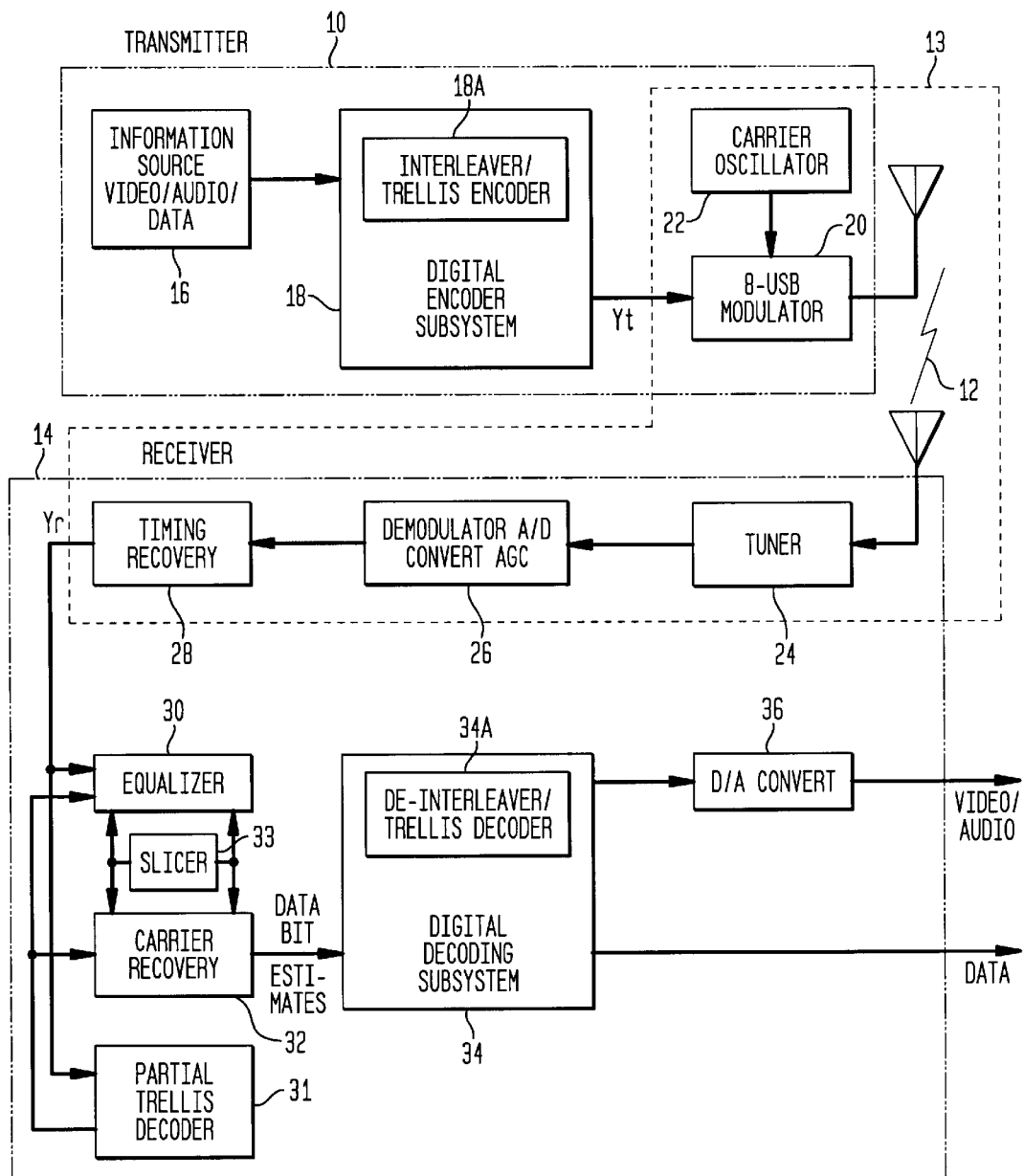
FIG. 1 is a block diagram of a digital communication system employing an equalizer in accordance with the present invention.

As shown in FIG. 1, a typical vestigial sideband (VSB) communications system has a transmitter station 10 and a receiver station 14, coupled together via a suitable propagation medium 12. The transmitter station 10 includes an information source 16 such as video, audio and/or data coupled to a digital encoding subsystem 18 including an interleaver/trellis encoder 18A. The in-phase real component, $Y_r$, from the VSB digital encoding subsystem 18 is coupled to VSB modulator 20, which modulates the signal $Y_t$ onto a suitable carrier frequency (provided by carrier oscillator 22) for transmission into the propagation medium 12.

The receiving station 14 includes a tuner 24, demodulator, A/D converter, and AGC (automatic gain control) functions 26, and a timing recovery module 28. The receiver timing recover module 28 reproduces the signal time slicing so that it is aligned with the signal in the transmitter. The receiving station 14 further includes an adaptive equalizer 30, a multiple level adaptive slicer 33, a carrier recovery loop 32, an error correction decoding function 34 including a de-interleaver/trellis decoder 34A, and a digital to analog (D/A) converter 36. In accordance with the present invention, a partial trellis decoder 31 is provided in order to estimate 1 or 2 bits of the 3 bit symbols in advance. The multiple level adaptive slicer 33 is responsive to the partial trellis decoder 31 to control the number and value of decision levels in the adaptive slicer 33 used for making hard decisions as to the value of each received 8-VSB symbol.

The system elements between the original $Y_t$ signal at the output of the digital encoding subsystem 18 in the transmitter 10, up to the output $Y_r$ of the timing recovery module 28 in the receiver is regarded as the overall communication channel 13. The function of the equalizer 30 in the receiver 14 is to compensate for distortion and noise originating anywhere in the overall communication channel 13.

In operation, the tuner 24 selects an appropriate carrier frequency for the propagation medium 12. The output of tuner 24 is converted to digital samples in an A/D converter and demodulated 26 to in-phase and quadrature components in the correct frequency range. Also, the AGC 26 feedback loop automatically adjusts the receiver gain level. The timing recovery function 28 pulls the local crystal oscillator that governs the A/D sampling clock into phase lock with the transmitted symbols. The recovered signal, $Y_r$, that is output from the timing recovery module 28 is input to the equalizer 30.

The equalizer 30 operates in conjunction with a carrier recovery module 32 that pulls the receiver local crystal oscillator into precise carrier frequency and phase lock with the transmitter oscillator, and provides data bit estimates to the error correction decoder 34. The slicer 33 has up to 8 levels by which to make a hard decision as to the value of a received 3-bit symbol. The slicer 33 is further responsive to the partial trellis decoder 31 to adjust the number of slicer levels and/or the values of the slicer levels.

The partial trellis decoder 31 provides advance (predicted) estimates of 1 or 2 data bits. When 1 bit of the 3-bit symbol is estimated in advance, the slicer 33 is conditioned to provide only 4 levels by which to make a hard decision as to the value of a received symbol. When 2 bits of the 3-bit symbol are estimated in advance, the slicer 33 is conditioned to provide only 2 levels by which to make a hard decision as to the value of a received symbol. Initially, the slicer mode is set to 8 level operation (8 slicer levels). Predicted bits from the partial trellis decoder 31 are used to select the equalizer 30 mode in CMA operation. After a first period of operation at 8 levels, the CMA mode is switched to 4 level operation (equivalent to 4 slicer levels). After a second period of operation at 4 levels, the CMA mode is switched to 2 level operation (equivalent to 2 slicer levels). The criteria for switching slicer modes is based on any one of suitable convergence criteria: a fixed time interval, the signal to noise ratio, the bit error rate or number of consecutive training sequences encountered.

After error correction decoding 34, the digital data is recovered, and reproductions of the original data, video, and audio are output from the receiver 14. The present invention is embodied in the equalizer 30, adaptive slicer 33 and partial trellis decoder 31 portions of the communication receiver 14.

Passband and Baseband Equalization

Figure 2:
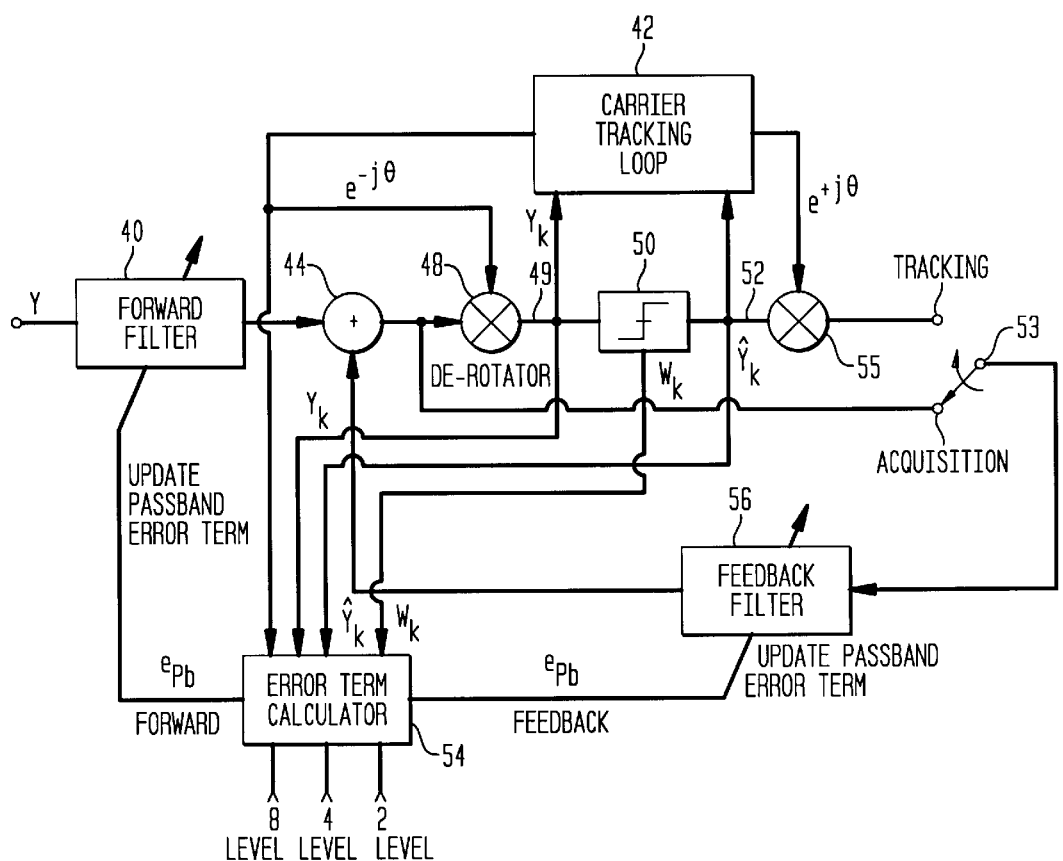
FIG. 2 is a block diagram of an equalizer and carrier recovery module for a digital communication receiver in accordance with the present invention.
Figure 3:
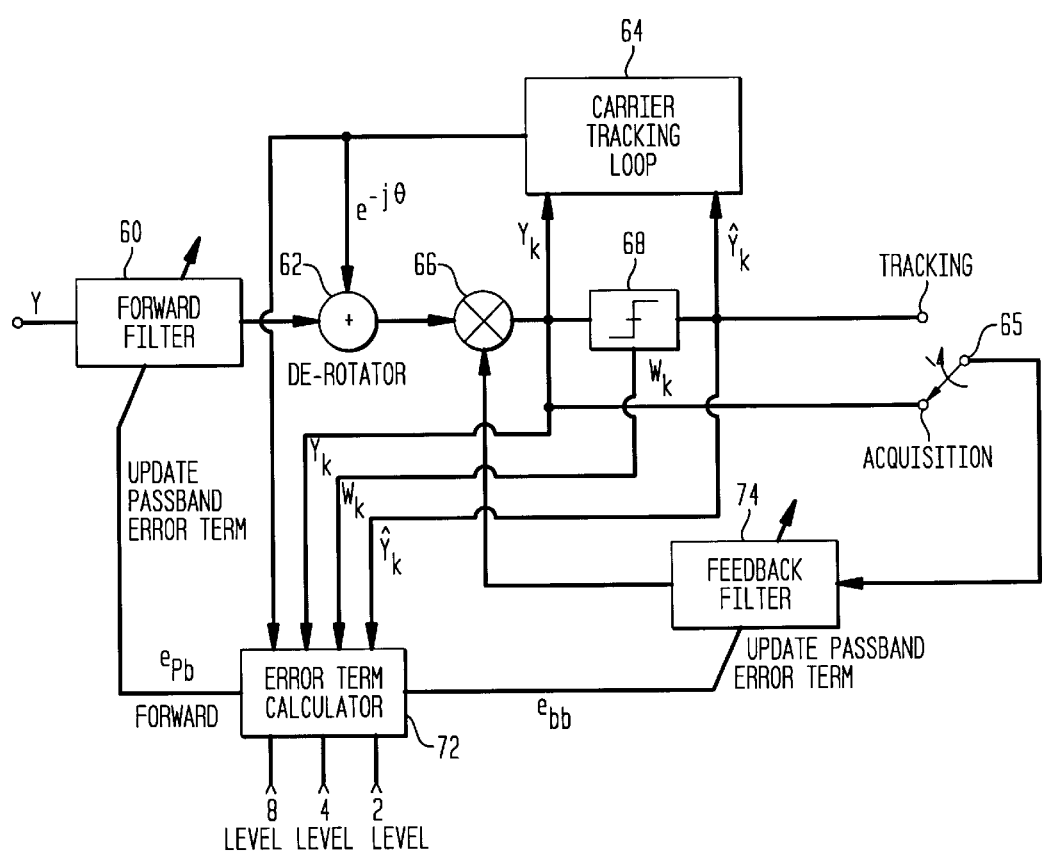
FIG. 3 is a block diagram of a second embodiment of an equalizer and carrier recovery module for a digital communication receiver in accordance with the present invention.
Figure 4:
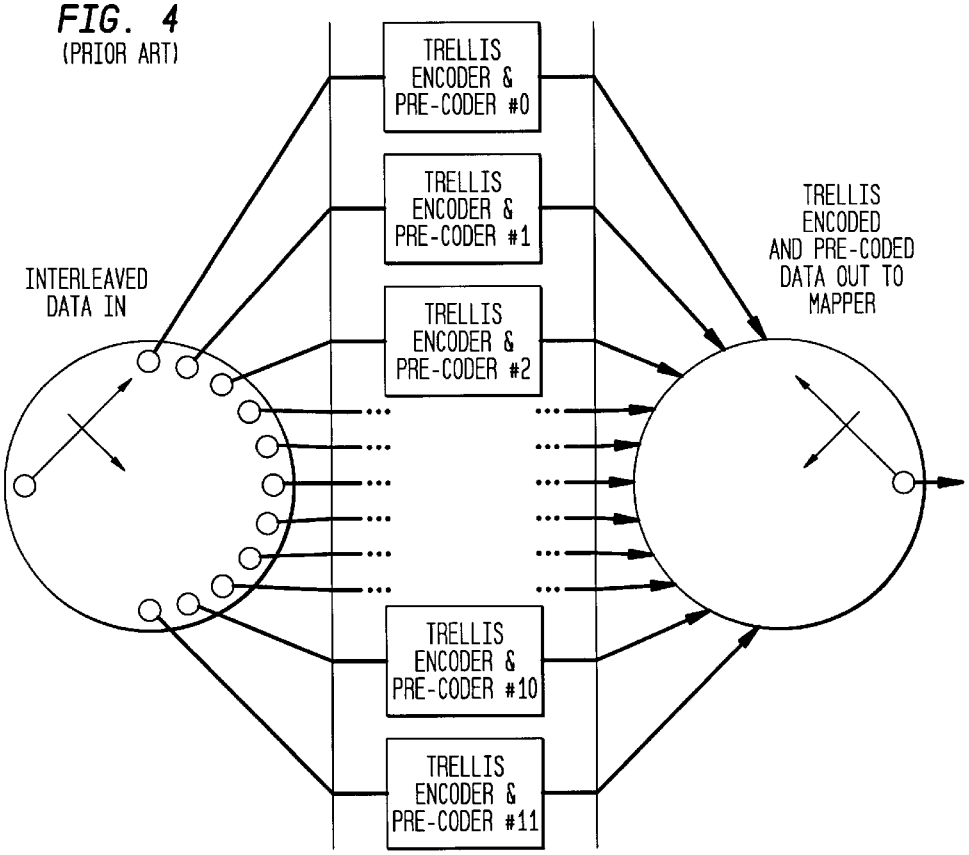
FIG. 4 is a block diagram in accordance with the prior art of a 12 interval trellis encoder showing interleaved data in accordance with the U.S. high definition television standard.

Further details of the equalizer 30, adaptive slicer 33 and carrier recovery 32 portions of FIG. 1 are shown in FIGS. 2 and 3. The difference between the embodiments of FIGS. 2 and 3 is that in FIG. 2, feedback equalization (filter 56) is performed at passband, while in FIG. 3, feedback equalization (filter 74) is performed at baseband.

For FIG. 2, the received $Y_r$ signal at the receiver is input to the forward equalizer filter 40, which is typically implemented as a finite impulse response (FIR) filter. The output of the forward equalizer filter 40 is input to an adder 44, after which a mixer (multiplier) 48 acts as a de-rotator to translate the processed $Y_r$ signal to baseband frequency (DC).

Received signal samples $Y_K$ at the output 49 of the mixer 48 are coupled to a multiple level adaptive slicer 50. The decision levels of slicer 50 are typically set for nominal decision threshold levels that correspond to each symbol in the expected 8-VSB single axis constellation. The input $Y_K$ to the slicer 50 represents the actual received signal levels, which have been filtered 40 and de-rotated 48. After the slicer 50, the output signal 52, $Y\char`\^_K$, represents hard decision levels, which correspond to the expected signal levels of the 8-VSB signal. In order to provide input for feedback equalization at passband to filter 56, the baseband output signal Y^K is re-rotated back to passband in mixer 55.

The carrier-tracking loop 42 internally comprises a phase detector, an internal loop filter and an internal sine/cosine generator. In combination with multiplier 48, the carrier-tracking loop is a closed loop feedback system for recovering the frequency and phase of the carrier signal. The phase difference between input signals 49 and output signals 52 of slicer 50 is detected in the carrier-tracking loop 42. The detected phase difference is filtered in the internal loop filter, which controls the frequency and phase of the internal sine/cosine generator. The phase error changes the frequency of the generated sine wave in a direction so as to reduce the detected phase difference between the input signals to the internal phase detector. At steady state frequency lock, the carrier-tracking loop 42 outputs a sinusoidal signal, $e^{-j\theta}$ which tracks the input carrier frequency and phase.

Both input $Y_K$ and output $Y\char`\^_K$ (from the slicer 50) are input to an error term calculator 54. To the extent that the inputs and outputs of the slicer 50 are not equal, the error term calculator 54 provides an output that can be used to update the passband error term in the forward equalizer filter 40 and the feedback equalizer filter 56. In order to generate a passband error term, the local carrier loop signal from carrier-tracking loop 42 is input to the error term calculator 54. Control inputs for 8-level, 4-level and 2-level slicer operation are input to the error term calculator 54. A switch 53 selects soft decision samples, $Y_K$, in the acquisition position, and hard decision samples, $Y\char`\^_K$, in the tracking position. In accordance with the present invention, the error term calculator 54 receives an additional output from the slicer, $W_K$, which is derived from 1 or 2 predicted bits of the present received symbol.

The embodiments of FIGS. 2 and 3 share many common features. The forward filter 40, carrier-tracking loop 42, de-rotator 48, adder 44, adaptive slicer 50, error term calculator 54, feedback filter 56 and switch 53 in FIG. 2 are analogous to forward filter 60, carrier-tracking loop 64, de-rotator 62, adder 66, adaptive slicer 68, error term calculator 72, feedback filter 74 and switch 65, respectively in FIG. 3. The differences are that in figure 2, the order of the adder 44 and de-rotator 48 are reversed, and the data output from the slicer is de-rotated by mixer 55 so that feedback filter 56 operates at passband instead of baseband. The feedback equalizer 74, operated at baseband, is implemented using a finite impulse response (FIR) filter imbedded in a feedback loop which makes the overall loop have an infinite impulse response (IIR). In both FIGS. 2 and 3, the present invention relates to the use of a partial trellis decoder in the adaptive slicer 50, 68 to generate $W_K$ for use in the adaptive CMA algorithm error term calculator 54, 72.

The following method of operation for FIG. 3 applies equally well for FIG. 2: In operation, from a cold start, switch 65 is initially set in the acquisition position. In accordance with the present invention, the CMA algorithm has three operating modes: 8-level, 4-level and 2-level. The equalizer algorithm is initially set to CMA, and the adaptive slicer 68 and the error term calculator 72 are set for 8-level CMA operation. After a first time period, the adaptive slicer 68 and the error term calculator 72 are set for 4-level operation. After a second time period, the adaptive slicer 68 and the error term calculator 72 are set for 2-level operation. Once a good initial estimate of the equalizer parameters is obtained by using the CMA algorithm to adjust the equalizer filter parameters (in 2-level CMA mode), the switch 65 is set to tracking position.

After a suitable time interval in the tracking position, the LMS algorithm may be used to adjust the passband and baseband error terms to the forward equalizer (filter 60) and the feedback equalizer (decision feedback filter 74) respectively. The criteria for determining time periods for switching within the three CMA acquisition modes, and from CMA to LMS tracking modes may be based on any one of suitable convergence criteria: a fixed time interval, the signal to noise ratio, the bit error rate or number of training sequences encountered. Alternatively, the system may stay in CMA mode while switched to the tracking position, and not need to use LMS equalization at all.

Figure 6:
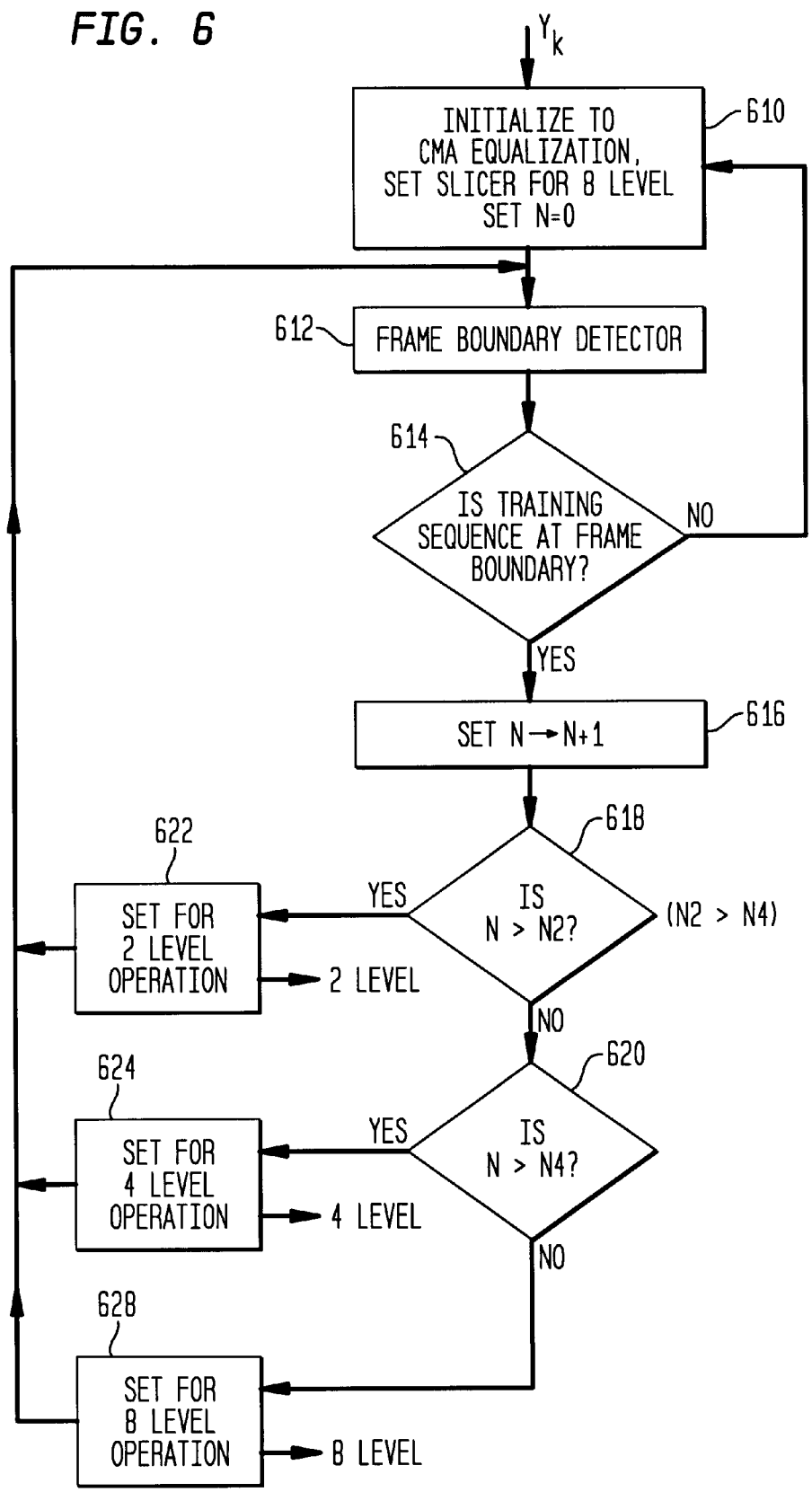
FIG. 6 is a flowchart diagram of a method of operation for a CMA equalizer in accordance with the present invention.

A method of operation for a CMA equalizer in accordance with the present invention using the number of training sequences encountered as the convergence criteria is illustrated in FIG. 6. The program is entered at step 610 where the system is initialized for CMA equalization operation. Initially, the CMA operating mode is set for 8 level operation, and an arbitrary variable, N, is set equal to zero. N represents the number of consecutive training sequences received. The criteria for switching between 8 level operation, 4 level operation and 2 level operation is based on the number of training sequences received. After a first predetermined number, N4, of consecutive training sequences is received, the system switches to 4 level operation. After a second predetermined number, N2 (which is greater than N4), of consecutive training sequences is received, the system switches to 2 level operation.

Each frame boundary is detected at step 612. If a training sequence is detected at the frame boundary at step 614, then N is incremented to N+1 at step 616. If at any time, no training sequence is received after the frame boundary is detected at step 614, then the system is reinitialized at step 610, setting the CMA equalizer operating mode for 8 level operation and resetting N to zero. Each time a frame boundary is detected at step 612 followed by a training sequence, N is incremented at step 616, and thereafter tested in steps 618 and 620. If N is not greater than N2 (step 618) or N4 (step 620), then the CMA equalizer operating mode is set for 8 level operation at step 624. If N is greater than N4 (a first predetermined constant) at step 620, then the CMA equalizer operating mode is set for 4 level operation at step 624. If N (number of consecutive training sequences received) is greater than N2 (a second predetermined constant) at step 618, then the CMA equalizer operating mode is set for 2 level operation at step 622.

Set Partitioned Data

Figure 5:
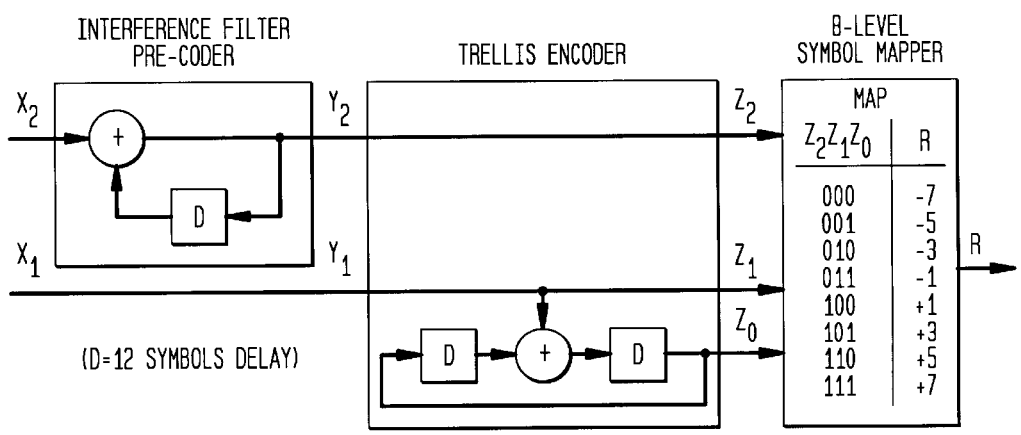
FIG. 5 is a block diagram in accordance with the prior art of a trellis decoder in accordance with the U.S. high definition television standard.

In the single axis of an 8-VSB constellation, 3 bits, Z2, Z1 and Z0 define each of the 8 symbols. From FIG. 5, it is seen that bit Z0 defines one of two 4-level subsets. In particular, the 8-level symbol set can be decomposed into the union of two 4-level sets $$\Delta^*[-7,-5,-3,-1,+1,+3,+5,+7] = \Delta^*[-5,-1,+3,+7] \cup \Delta^*[-7,-3,+1,+5]$$

where $\cup$ denotes union. The first subset corresponds to bit Z0=1 and the second subset corresponds to bit Z0=0. Therefore, if bit Z0 can be estimated, then a zero-mean 4-level signal can be created from the two subsets in the following manner: if Z0=1, then subtract $\Delta$ from the value in the first subset, or if Z0=0, then add $\Delta$ to the value in the second subset. The new 4-level signal assumes the nominal values $\Delta^*[-6, -2, +2, +6]$, which has zero mean as required by the CMA algorithm. The addition and/or subtraction of the offset $\Delta$ removes the bias in the subsets, which form the set partition so that the new 4-level signal set is zero-mean.

The 8-level symbol set can be further decomposed into four subsets, each containing two elements. From FIG. 5, it is seen that bits Z0 and Z1 define one of four 2-level subsets. In particular, the 8-level symbol set can be decomposed into the union of four 2-level sets $$\Delta^*[-7,-5,-3,-1,+1,+3,+5,+7] = \Delta^*[-7, +1] \cup \Delta^*[-1,+7] \cup \Delta^*[-3, +5] \cup \Delta^*[-5, +3]$$

The first subset corresponds to bits Z0=0 and Z1=0, the second subset corresponds to bits Z0=1 and Z1=1, the third subset corresponds to bits Z0=0 and Z1=1, and the fourth subset corresponds to bits Z0=1 and Z1=0. Therefore, if two bits, Z0 and Z1 can be estimated, then a zero-mean 2-level (or constant modulus) signal can be created. If Z0 =0 and Z1=0, then add $3\Delta$ to the value in the first subset. If Z0=1 and Z1=1 then subtract $3\Delta$ from the value in the second subset. If Z0=0 and Z1=1 then subtract $\Delta$ to the value in the third subset. If Z0=1 and Z1=0 then add $\Delta$ to the value in the fourth subset. Therefore, the 2-level (constant modulus) signal is zero-mean and assumes the values $\Delta^*[-4, +4]$.

Adaptive Equalization

The CM (constant modulus) criterion penalizes the variance of the squared-magnitude of the equalizer output, $y_k$, about a constant value. For example, the CM criterion is mathematically expressed as $$J_{CM} = E\{(\gamma - |y_k|^2)^2\}$$

where $E\{.\}$ denotes statistical expectation (or mean) and $\gamma$ is a constant referred to as the Godard radius (or sometimes Godard's dispersion constant). The Godard radius is calculated as shown by D. N. Godard, in "Self-recovering equalization and carrier tracking in two-dimensional data communication systems," IEEE Transactions on Communications, vol 28, no. 11, pp. 1867–1875, November 1980.

$$\gamma = E\{|S_k|^4\}/E\{|S_k|^2\}$$

for source sequence $S_k$. Hence, for an equally probable source sequence chosen from the 8-level symbol set $\Delta^*[-7, -5, -3, -1, +1, +3, +5, +7]$ the Godard radius ($\gamma_8$) is calculated as $\Delta^2*37$.

The Constant Modulus Algorithm (CMA) is the adaptive algorithm that minimizes the CM criterion by a stochastic, gradient descent. The equalizer parameters are updated at each symbol instance, k, according to the rule (for 8-level), $$f_{k+1} = f_k + \mu r_k^* y_k (\gamma - |y_k|^2)$$

where $f_k$ is the equalizer coefficient, $\mu$ is a small, positive scalar referred to as the stepsize, $r_k$ is the data sample, and $(.)^*$ denotes complex conjugation.

There are two cost functions related to the CM criterion, for which there are different low-jitter stochastic gradient update rules. Using either the 4-level or 2-level real-valued signals created from the flow chart in FIG. 7 ($W_K$), the cost function for low jitter CMA is $$J_{LJ} = E\{(\gamma_{LJ} - |W_k|^2)^2\}$$

which is minimized using the stochastic gradient descent rule (for 4-level of 2-level)

$$f_{k+1} = f_k + \mu r_k^* W_k (\gamma_{LJ} - |W_k|^2)$$

The rule is similar to single axis CMA, but different since it operates not on the 8-level signal, but on the 4-level or 2-level signal, and the output sample $Y_K$ is replaced by the shifted sample $W_K$. Also, the Godard radius for the 8-level symbol set ($\gamma_8$) is replaced by the Godard radius for the corresponding 4 or 2-level set, ($\gamma_4$) or ($\gamma_2$). For example, if the Z0 bit is estimated and a 4-level signal is created which assumes equally probable sample values from the symbol set $\Delta^*[-6, -2, +2, +6]$, then the Godard radius ($\gamma_4$) is calculated as $\Delta^2*32.8$. Similarly, if both the bits Z0 and Z1 are estimated and a 2-level signal is created which assumes probable sample values from the symbol set $\Delta^*[-4, +4]$, then the Godard radius ($\gamma_2$) is calculated as $\Delta^2*16$.

Since the low jitter CMA operates on the 4 or 2-level signal, its stochastic jitter (or excess mean square error) is reduced compared to single axis-CMA, which operates on the 8-level signal. The excess mean square error associated with CMA is proportional to a term that depends on higher-order moments of the source alphabet. This excess mean square error term (for real-valued alphabets) is mathematically expressed as excess mean square error=$[E\{s^6\}/E^3\{s^2\} - (E\{s^4\}/E^2\{s^2\})^2]*[E\{s^2\}/$ $2(3-E\{s^4\}/E^2\{s^2\})]$ where s is related to the number of symbols in the source alphabet. As the order of the source constellation is increased, the excess mean square error of CMA is also increased. For example, with a source alphabet of 8 symbols (8-level signaling and the symbol set [−7, −5, −3, −1, +1, +3, +5, +7], setting ΔA=1 for simplicity) the excess mean square error term is calculated as 91.4. However, using low jitter CMA operating on a source alphabet of 4 symbols (4-level signaling with nominal values [−6, −2, +2, +6]) the excess mean square error term is calculated as 33.9. The saving in excess mean square error is approximately 4.3 dB, which is significant. Even more significant, if low jitter CMA is used with a source alphabet of 2 symbols (2-level signal with nominal values [−4, +4]) the signal set is constant modulus and no penalty in excess mean square error is present due to the source alphabet. The excess mean square error term for a source alphabet of 2 symbols is zero.

Multiple Mode CMA Equalization

Figure 7:
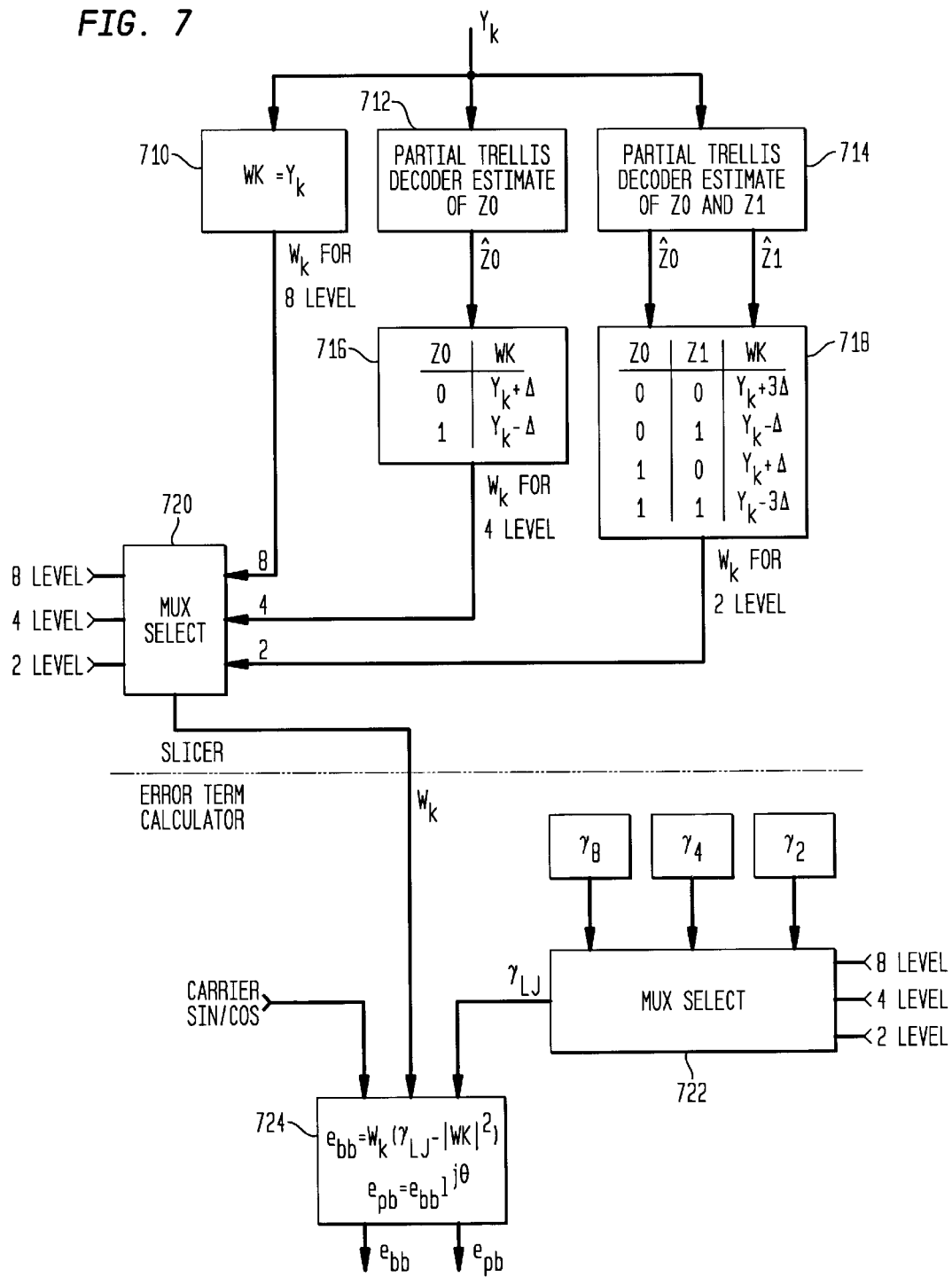
FIG. 7 is a block diagram illustrating the method for calculating the CMA error function, and controlling a multiple level adaptive slicer in accordance with the present invention.

As indicated, the operating mode (8-level, 4-level or 2-level) of the CMA equalizer, i.e., the calculation of the CMA error term, is determined in accordance with the convergence flowchart logic of FIG. 6. The operating mode determines t he offset as a multiple of Δ that is applied to the received soft signal samples, $Y_K$, for which the CMA error function will be calculated. The operating mode also determines the value of the constant, $\gamma_{LJ}$, for which the CMA error function will be calculated. FIG. 7 is a flowchart diagram illustrating the computation of the error function for a CMA equalizer for each operating mode.

During initialization, at step 710, (in 8-level mode) the multiple mode CMA equalizer is set for nominal expected 8-level symbols where $W_K=Y_K$. In 4-level mode, when an advance estimate of bit Z0 is available 712, the multiple mode CMA equalizer is set for 4-level mode by shifting the input signal $Y_K$ according to the truth table at step 716. If Z0 is equal to 0, Δ is added to $Y_K$ to form $W_K$. If Z0 is equal to 1, −Δ is added (Δ is subtracted by the signed addition of −Δ) to $Y_K$ to form $W_K$. In 2-level mode, when an advance estimate of bits Z0 and Z1 is available 714, the multiple mode CMA equalizer is set for 2-level mode by shifting the input signal $Y_K$ according to the truth table at step 718. If Z0, Z1 is equal to 1,0 or 0,1 then +Δ or −Δ is added to $Y_K$ to form $W_K$. If Z0, Z1 is 1,1 or 0,0 then +3Δ or −Δ is added to $Y_K$ to form $W_K$.

Multiplexer 720 selects one of either $W_K$ for 8-level, 4-level or 2-level operation in accordance with the operating mode. At the same time, a value for $\gamma_{LJ}$ is selected by multiplexer 722. The value of $\gamma_{LJ}$ is selected equal to either $\gamma_8$, $\gamma_4$, or $\gamma_2$, in accordance with the corresponding 8-level, 4-level or 2-level operating mode. The baseband error, $e_{bb}$, is computed in step 724 using the selected value for $W_K$ and $\gamma_{LJ}$. The passband error, $e_{pb}$, is computed using the baseband error term, $e_{bb}$, and the recovered carrier signal, $e^{j\theta}$.

Figure 8:
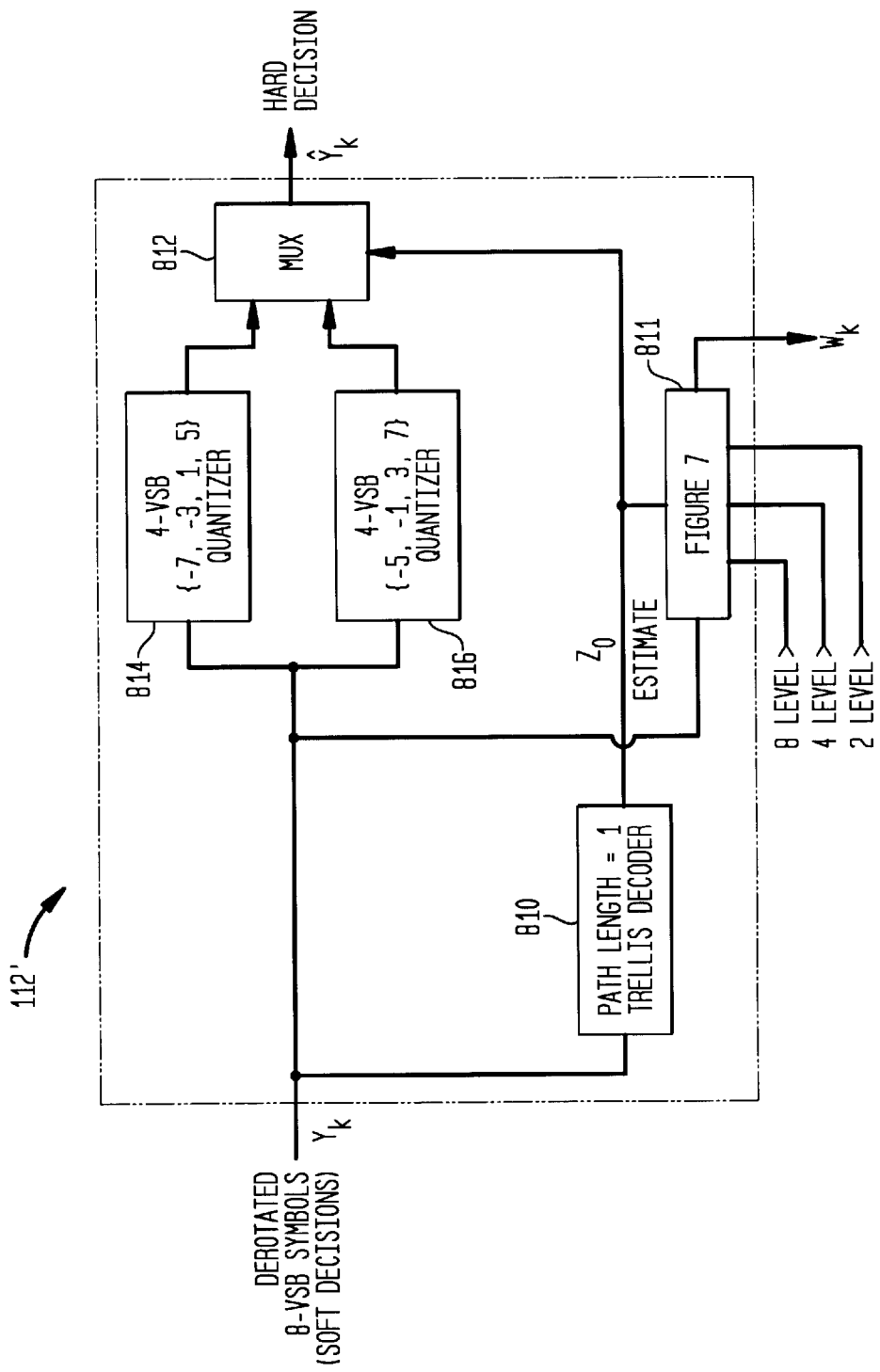
FIG. 8 is a block diagram showing the configuration of a 4-level adaptive slicer for use in conjunction with the present invention.

A block diagram of a four level quantizer 112' is shown in FIG. 8. Four level quantization is achieved by providing a multiplexer 812 to select one of two 4-level quantizers 814, 816 responsive to a partial trellis decoder 810. In operation, soft sample 8 VSB signals are provided to the partial trellis decoder 810, which provides an estimate of data bit Z0 to multiplexer 812. Multiplexer 812, responsive to the estimate of bit Z0, selects a first quantizer 814, or a second quantizer 816. The quantization levels provided by quantizers 814 and 816 are disjoint sets of two 4-VSB constellations, the union of which form the original 8 VSB constellation. The selected quantizer 814 or 816 provides hard decision values at the output of the multiplexer 812. The signal, $W_K$, for the error calculation in the multiple mode CMA equalizer is derived from $Y_K$ by a level shifter 811, operating in accordance with FIG. 7.

Figure 9:
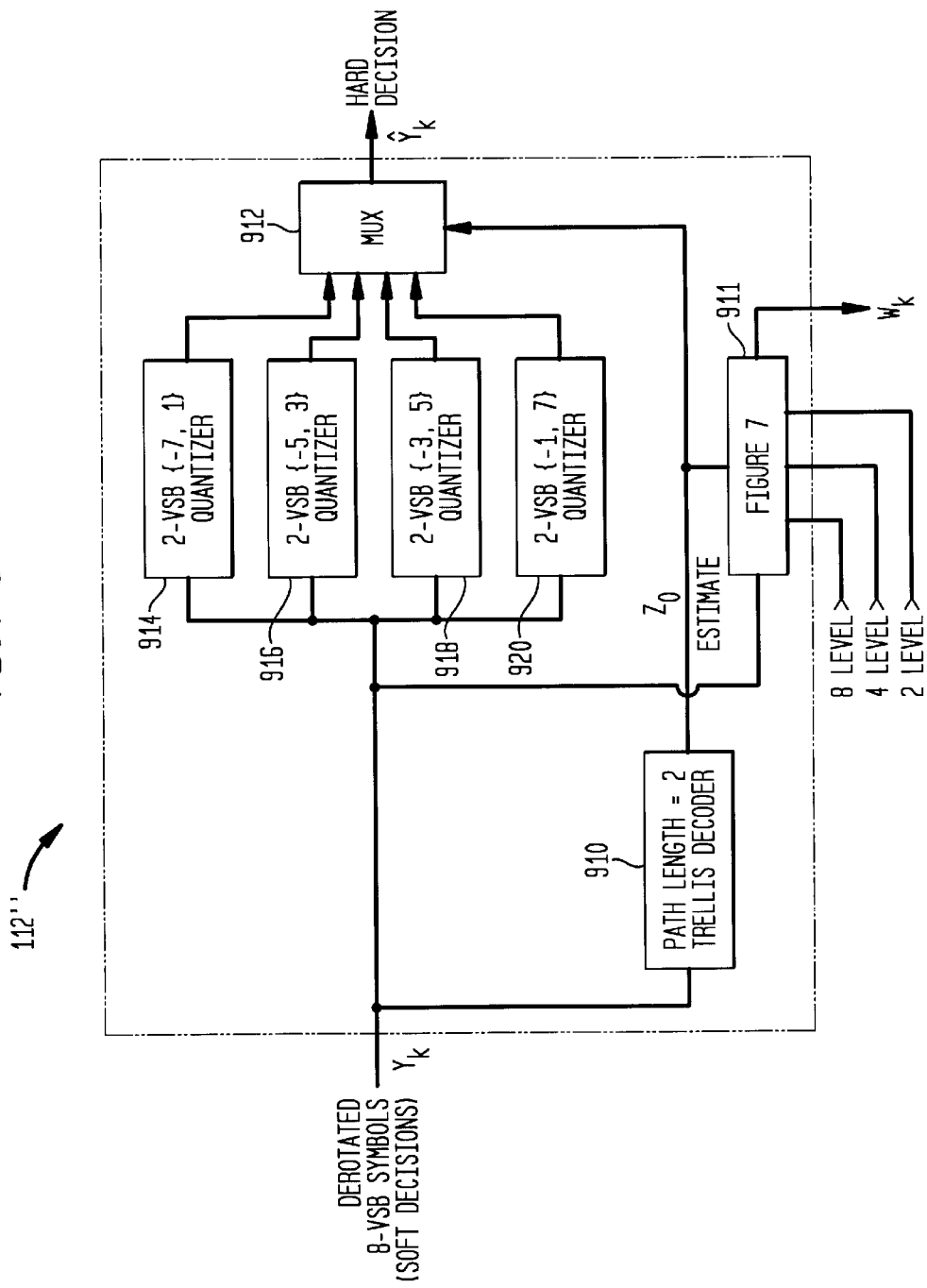
FIG. 9 is a block diagram showing the configuration of a 2-level adaptive slicer for use in conjunction with the present invention.

A block diagram of a two level quantizer 112" is shown in FIG. 9. Two level quantization is achieved by providing a multiplexer 912 to select one of four 2 level quantizers 914, 916, 918, 920 responsive to a partial trellis decoder 910. In operation, soft sample 8 VSB signals are provided to the partial trellis decoder 910, which provides an estimate of data bits Z0 and Z1 to multiplexer 912. Multiplexer 912 responsive to the estimates of bits Z0 and Z1, selects one of the first, second, third or fourth quantizers 914, 916, 918, 920. The quantization levels provided by quantizers 914, 916, 918, 920 are disjoint sets of four 2-VSB constellations, the union of which form the original 8 VSB constellation. The selected quantizer 914, 916, 918 or 920 provides hard decision values at the output of the multiplexer 912. The signal, $W_K$, for the error calculation in the multiple mode CMA equalizer is derived from $Y_K$ by a level shifter 911, operating in accordance with FIG. 7.

What is claimed is:

1. In a digital communications receiver having a received signal representing a sequence of symbols, each symbol comprising a plurality of data bits, each symbol being encoded by a given code, said digital communications receiver further including an adaptive equalization filter with adjustable equalization filter parameters, an adaptive equalization method for determining said adjustable equalization filter parameters responsive to said received signal, said method comprising:

partially decoding at least one symbol of said sequence of symbols to form a first predicted bit of a received symbol;

determining an offset value based on said first predicted bit;

adding said offset value to said received signal to form a shifted received signal; and deriving said adjustable equalization filter parameters responsive to said shifted received signal in accordance with a blind equalization algorithm.

2. A method in accordance with claim 1, wherein said blind equalization algorithm is the Constant Modulus Algorithm.

3. A method in accordance with claim 1, wherein said given code is a trellis code.

4. A method in accordance with claim 1, wherein said step of setting determining an offset value based on said first predicted bit comprises selecting said offset value so that said shifted received signal has a zero mean.

5. A method in accordance with claim 2, wherein said adjustable equalization filter parameters are derived from said shifted received signal to minimize a cost function given by $$J_{LJ}=E\{(\gamma_{LJ}-|w_k|^2)^2\},$$

where $\gamma_{LJ}$ represents a constant derived from said offset value where E{.} denotes statistical expectation and where $W_k$ represents said shifted received signal.

6. A method in accordance with claim 5, in which said cost function is minimized using the stochastic gradient descent rule given by $$f_{k+1}=f_k+\mu r_k^* w_k(\gamma_{LJ}-|w_k|^2)$$

where $w_k$ represents said shifted received signal, and where $f_k$ is the equalizer coefficient, $\mu$ is a small, positive scalar referred to as the stepsize and $r_k$ is the data sample.

7. A method in accordance with claim 1, wherein said method further comprises:
   partially decoding at least two prior symbols of said sequence of symbols to form a second predicted bit of said received symbol based on said two prior symbols of said sequence of symbols; and
   determining said offset value based on said first and second predicted bits.

8. A method in accordance with claim 1, wherein said adaptive equalization method has first and second operating modes, said first operating mode corresponding to operation without adding said offset value to said received signal, said second operating mode corresponding to adding said offset to said received signal, and wherein said digital communications receiver switches between said first and second operating modes based on a fixed time interval.

9. A method in accordance with claim 1, wherein said adaptive equalization method has first and second operating modes, said first operating mode corresponding to operation without adding said offset value to said received signal, said second operating mode corresponding to adding said offset to said received signal, and wherein said digital communications receiver switches between said first and second operating modes based on the bit error rate of said received signal.

10. A method in accordance with claim 1, wherein said adaptive equalization method has first and second operating modes, said first operating mode corresponding to operation without adding said offset value to said received signal, said second operating mode corresponding to adding said offset to said received signal, and wherein said digital communications receiver switches between said first and second operating modes based on the signal to noise ratio of said received signal.

11. A method in accordance with claim 1, wherein said adaptive equalization method has first and second operating modes, said first operating mode corresponding to operation without adding said offset value to said received signal, said second operating mode corresponding to adding said offset to said received signal, and wherein said digital communications receiver switches between said first and second operating modes based on the number of consecutive periodic training sequences received on said received signal.

12. In a digital communications receiver having an adaptive equalization filter, said digital communications receiver further including a received signal representing a sequence of symbols, each symbol being encoded by a given code and comprising a plurality of data bits, an improved adaptive equalizer comprising:
   a partial decoder responsive to at least one prior symbol of said sequence of symbols to decode a first predicted bit of a received symbol; and
   a signal shifter having a first input terminal coupled to said received signal and a second input terminal coupled to said first predicted bit from said partial decoder, and an output terminal coupled to said adaptive equalization filter, said signal shifter including an offset generator responsive to said first predicted bit at said second input terminal to provide an offset value to shift said received signal at said first input terminal by said offset value,
   whereby said offset value is added to said received signal to form a shifted received signal to said adaptive equalization filter.

13. An adaptive equalizer in accordance with claim 12, wherein said adaptive equalization filter includes an adaptive equalization filter having adjustable equalization filter parameters, wherein the algorithm for adjusting said equalization filter parameters is the Constant Modulus Algorithm.

14. An adaptive equalizer in accordance with claim 12, wherein said given code is a trellis code.

15. An adaptive equalizer in accordance with claim 12, wherein said offset value is selected so that said shifted received signal has a zero mean.

16. An adaptive equalizer in accordance with claim 13, wherein said adjustable equalization filter parameters are derived from said shifted received signal to minimize a cost function given by $$J_{LJ}=E\{(\gamma_{LJ}-|w_k|^2)^2\},$$

where $\gamma_{LJ}$ represents a constant derived from said offset value
where $E\{.\}$ denotes statistical expectation and where $W_k$ represents said shifted received signal.

17. An adaptive equalizer in accordance with claim 16, in which said cost function is minimized using the stochastic gradient descent rule given by $$f_{k+1}=f_k+\mu r_k^* w_k(\gamma_{LJ}-|w_k|^2)$$

where $w_k$ represents said shifted received signal and
where $f_k$ is the equalizer coefficient, $\mu$ is a small, positive scalar referred to as the stepsize and $r_k$ is the data sample.

18. An adaptive equalizer in accordance with claim 12, wherein said improved adaptive equalizer further comprises:
   a partial decoder responsive to at least two prior symbols of said sequence of symbols to decode a second predicted bit of a received symbol; and
   said offset generator being further responsive to said second predicted bit to provide said offset value to shift said received signal at said first input terminal by said offset value.

19. An adaptive equalizer in accordance with claim 12, wherein said adaptive equalizer has first and second operating modes, said first operating mode corresponding to operation without adding said offset value to said received signal, said second operating mode corresponding to adding said offset to said received signal, and wherein said digital communications receiver switches between said first and second operating modes based on a fixed time interval.

20. An adaptive equalizer in accordance with claim 12, wherein said adaptive equalizer has first and second operating modes, said first operating mode corresponding to operation without adding said offset value to said received signal, said second operating mode corresponding to adding said offset to said received signal, and wherein said digital communications receiver switches between said first and second operating modes based on the bit error rate of said received signal.

21. An adaptive equalizer in accordance with claim 12, wherein said adaptive equalizer has first and second operating modes, said first operating mode corresponding to operation without adding said offset value to said received signal, said second operating mode corresponding to adding said offset to said received signal, and wherein said digital communications receiver switches between said first and second operating modes based on the signal to noise ratio of said received signal.

22. An adaptive equalizer in accordance with claim 12, wherein said adaptive equalizer has first and second operating modes, said first operating mode corresponding to operation without adding said offset value to said received signal, said second operating mode corresponding to adding said offset to said received signal, and wherein said digital communications receiver switches between said first and second operating modes based on the number of consecutive periodic training sequences received on said received signal.

* * * * *